Figure 1:
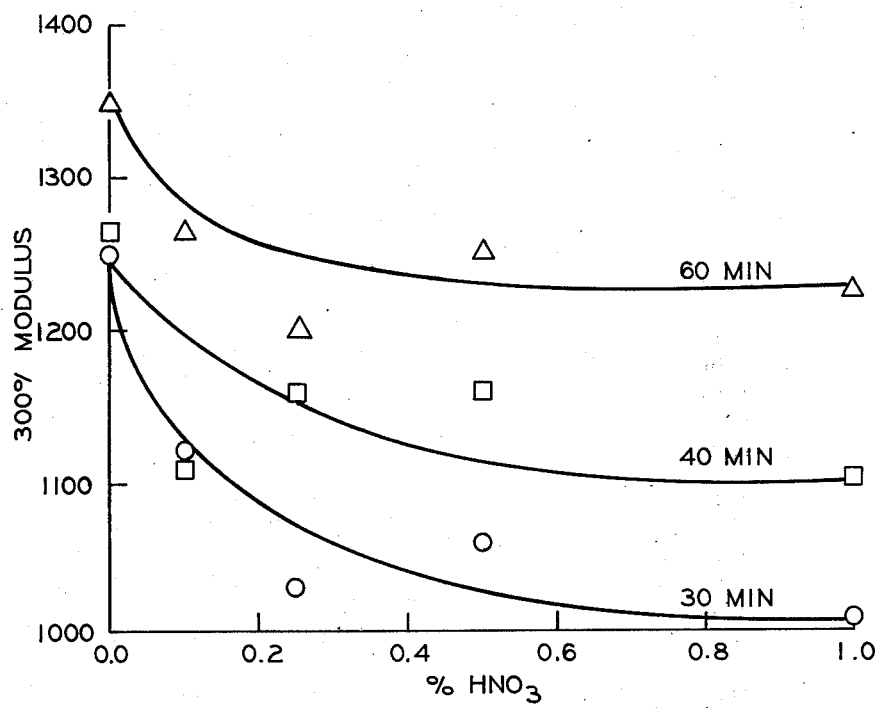

United States Patent [19]

Hunt

[11] 4,075,140
[45] Feb. 21, 1978

[54] OXIDIZING CARBON BLACK AND USE OF IT IN ELASTOMERS

[75] Inventor: Harold R. Hunt, Bartlesville, Okla.

[73] Assignee: Phillips Petroleum Company, Bartlesville, Okla.

[21] Appl. No.: 678,098

[22] Filed: Apr. 19, 1976

[51] Int. Cl.² .................... C08K 3/04; C09C 1/56
[52] U.S. Cl. ........................... 260/5; 106/307; 260/42.47; 260/763; 423/460
[58] Field of Search ........... 106/307; 423/460; 260/5, 42.47, 763

[56] References Cited

U.S. PATENT DOCUMENTS

| | | | |
|---|---|---|---|
| 2,657,117 | 10/1953 | Sperberg | 423/460 |
| 2,676,873 | 4/1954 | Cines et al. | 423/460 |
| 2,686,107 | 8/1954 | Jordan | 423/461 |
| 2,964,392 | 12/1960 | Drummond | 23/314 |
| 3,247,003 | 4/1966 | Pollock | 423/460 |
| 3,301,694 | 1/1967 | Kraus et al. | 106/307 |
| 3,336,148 | 8/1967 | Gunnell et al. | 106/307 |
| 3,481,754 | 12/1969 | Lewis et al. | 423/460 |
| 3,523,812 | 8/1970 | Kraus | 106/307 |
| 3,565,657 | 2/1971 | Dannenberg et al. | 423/460 |
| 3,870,785 | 3/1975 | Henderson | 106/307 |

Primary Examiner—Melvin I. Marquis
Assistant Examiner—H. H. Fletcher

[57] ABSTRACT

A considerable reduction in modulus, as well as a significant increase in scorch time of a carbon black-containing rubber composition is obtained if the carbon black has been previously oxidized with a very diluted aqueous nitric acid containing only about 0.05 to 1 wt. % of $HNO_3$ and dried at a temperature of about 400° to 550° F.

5 Claims, 2 Drawing Figures

OXIDIZING CARBON BLACK AND USE OF IT IN ELASTOMERS

The present invention relates to an oxidation treatment of carbon black. More particularly the present invention relates to a pelletizing process for the production of carbon black pellets conferring specific properties to a rubber composition incorporating this carbon black. This invention also relates to rubber compositions containing a specifically treated carbon black.

BACKGROUND OF THE INVENTION

Carbon black, which is made by the pyrolytic decomposition of hydrocarbon feedstocks such as oil in a furnace process, strongly influences the properties of rubber compositions containing such carbon black. It is known in the art that various after treatments of carbon black influence the properties of rubber composition containing such carbon blacks. It has been reported, for instance, that heating a furnace-type black in contact with aqueous nitric acid at a high temperature will increase the diphenylguanidine absorption value of the carbon black. Other references show that oxidation of carbon black with nitric acid lowers the modulus of the rubber composition containing such carbon black.

The specification for the carbon black by the carbon black consumer contains usually the two properties modulus and scorch time. The modulus is a measure for the force per unit of cross-section necessary to elongate a sample of rubber to a certain elongation such as 300%. The scorch time is a measure that relates to the curing properties of the carbon black. Generally a low scorch time relates to a fast curing rubber and a high scorch time correspondingly to a slow curing rubber. During the carbon black production, the modulus and the scorch time are determined by compounding the carbon black produced with rubber and determining the properties defined. It sometimes occurs that the carbon black as produced, mixed with rubber, result in a composition having a too high modulus and/or a too low scorch time as compared to the specification and as such is considered "off-specification". It would, therefore, be desirable to have a process available by which such off-specification carbon black resulting in a too high modulus and/or a too short scorch time can be brought back to the specification.

In the prior art after treatment of carbon black with nitric acid, the nitric acid is employed in the range of concentration of 5 wt. % in water or more. The nitric acid treatment both adds to the cost of the ultimate carbon black product and introduces handling and corrosion problems. It would, therefore, be desirable to have a process available by which both the cost mentioned and the handling problems described could be reduced.

THE INVENTION

It is, therefore, one object of this invention to provide a process for treating carbon black.

A further object of this invention is to provide a process for oxidizing carbon black in order to reduce the modulus and to increase the scorch time of a rubber composition containing such a carbon black.

Yet a further object of this invention is to provide a process for treating off-specification carbon black.

Still another object of this invention is to provide a rubber composition with controlled modulus and scorch time, incorporating an oxidized carbon black.

These and other objects, features, details, advantages and embodiments of this invention will become apparent to those skilled in the art from the following detailed description of the invention, the appended claims and the drawing of which FIG. 1 shows a diagram of the change in 300% modulus depending upon the nitric acid concentration and having the curing time as a parameter for a rubber composition containing the different carbon blacks.

Figure 2:
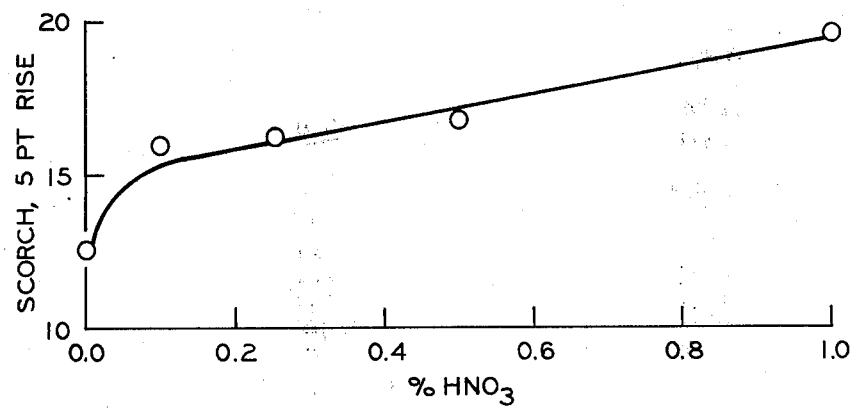

FIG. 2 shows a diagram of the scorch time for a rubber composition containing various carbon blacks in relation to the nitric acid concentration utilized for the oxidation of the various carbon blacks.

In accordance with this invention, I have now found that a considerable reduction in modulus, as well as an increase in scorch time of a rubber composition incorporating an oxidized carbon black, can be achieved if this carbon black is oxidized by contacting the carbon black with aqueous nitric acid at a weight ratio of $HNO_3$ to carbon black in the range of $5 \times 10^{-4}$ to $1 \times 10^{-2}$ and drying the thus treated carbon black at temperatures in the range of about 400° to about 550° F. It has been found that a treatment of carbon black with such low concentration of $HNO_3$ and such low drying temperatures results in a desirable significant reduction in modulus, as well as an increase in scorch time. The preferred weight ratio of $HNO_3$ to carbon black is in the range of $5 \times 10^{-4}$ to $3 \times 10^{-3}$.

The nitric acid is applied to the carbon black by contacting the carbon black with aqueous nitric acid having a concentration of preferably 0.05 to 1 wt. % of $HNO_3$ in water. The possibility of using such low concentration aqueous nitric acid solutions can result in a reduction of corrosion rate depending on materials used and reduced raw material costs. Therefore, even more diluted aqueous nitric acid solutions in a range of about 0.05 wt. % to about 0.4 wt. %, preferably about 0.1 to about 0.2 wt. % of $HNO_3$ in water can be used.

The aqueous nitric acid is preferably used in a quantity that is defined by the weight ratio of aqueous nitric acid to dry carbon black to be within the range of about 2:1 to about 1:2. More preferably still this weight ratio of aqueous nitric acid to dry carbon black is in the range of about 2:3 to about 3:2.

In accordance with one embodiment of this invention, the dry carbon black is pelleted with the aqueous nitric acid. Thereafter the wet carbon black pellets are dried at the defined temperature of about 400 to about 550° F to obtain dried carbon black pellets. Significant oxidation of the carbon black is achieved. This oxidation results in considerable changes of properties of rubber compositions containing this carbon black.

The pelleting of the carbon black with the aqueous nitric acid can be carried out in a conventional pelleting mill. The temperature in the pelleting mill preferably is about 210° F. The pelleting time generally will be in the range of about 10 to about 15 minutes. The drying of the wet carbon black pellets containing, e.g., about 50 wt. % of water by conventional drying means in the temperature range of about 400° to about 550° F takes about 30 to about 40 minutes.

In accordance with another embodiment of this invention, there is provided a process for adjusting carbon black properties that influence the modulus and scorch time of rubber compositions containing such carbon black. This process allows a control of these properties by an after treatment of the produced carbon black without the necessity of having to adjust the process parameters in the process of producing the carbon black as such. This adjusting or controlling process of this invention comprises the steps of compounding a rubber composition including a sample of carbon black, determining the modulus and/or scorch time of this rubber composition, comparing the determined modulus and/or scorch time with a preselected upper limit for the modulus and/or a lower limit for the scorch time and, if the modulus determined is above said upper limit and/or if the determined scorch time is below said lower limit for the scorch time, oxidizing the carbon black by contacting the carbon black with aqueous nitric acid at a weight ratio of $HNO_3$ to carbon black in the range of about $5 \times 10^{-4}$ to $1 \times 10^{-2}$ and drying the treated carbon black at temperatures in the range of about 400° to about 550° F. This treatment results in a reduction of the modulus, as well as in an increase in scorch time. Thus off-specification carbon black can be treated such as to bring it back into the specification limits without severe corrosion problems for the equipment used in this process. The specific variations and preferred embodiments in this process for adjusting or controlling the modulus and scorch time of a rubber composition containing the oxidized carbon black are the same as those disclosed above in connection with the description of the oxidation process itself.

The determination of the modulus is preferably carried out in accordance with the standard test method ASTM D 412-68. Similarly, the scorch time preferably is determined in accordance with the ASTM standard test method D 1646-74.

In accordance with another embodiment of this invention, there is provided a carbon black as the product of the oxidation process just described. The preferred carbon black product of this invention is a pelleted carbon black which is obtained by pelleting flocculent carbon black in admixture with the very diluted aqueous nitric acid described and defined above under the conditions given and drying and oxidizing the obtained wet pellets.

Yet a further embodiment of this invention consists in a rubber composition comprising about 125 to 250 parts by weight of a rubber selected from the group consisting of natural rubber, synthetic rubber and mixtures thereof, and about 100 parts by weight of an oxidized carbon black obtained by the procedure defined above. The preferred rubber composition contains 70 parts by weight of carbon black, 125 parts by weight of rubber and conventional additives.

The invention will still be more fully understood from the following description of examples which are intended to illustrate further preferred embodiments and variations of this invention but are not intended to limit the scope thereof.

EXAMPLE I

Five samples of flocculent carbon black N339, which is commercially obtainable from Phillips Petroleum Company, Bartlesville, Okla., were used in a laboratory scale pelletizer to form pellets. The pelleting liquid was water or, respectively, a very diluted aqueous nitric acid solution. The carbon black and the pelleting liquid were placed into the laboratory scale pelletizer in a 1:1 weight ratio. The pellet mill for each of the examples was operated at a temperature of 100° F for 30 minutes. These wet pellets were dried using nitrogen gas until they contained about 0.1 wt. % water. The final temperature reached in the batch drying was about 500° F. The resulting carbon black pellets were tested under standard procedures to determine the properties of the carbon black. The results are shown in the following table, in which Run 1 indicates a comparative run with a carbon black pelletized with water containing no nitric acid.

TABLE I

| | \multicolumn{5}{c}{$HNO_3$ Oxidation of N339 Carbon Black} |
|---|---|---|---|---|---|
| | 1 | 2 | 3 | 4 | 5 |
| | | \multicolumn{4}{c}{Wt. % $HNO_3$} |
| Run No. | 0 | 0.1 | 0.25 | 0.5 | 1.0 |
| pH[1] | 6.7 | 6.6 | 6.4 | 6.4 | 5.7 |
| DPG[2] | 11.8 | 14.8 | 16.8 | 18.3 | 26.7 |
| $N_2SA$[3] | 105 | 106 | 106 | 106 | 107 |
| CTAB[4] | 99 | 102 | 102 | 102 | 105 |
| 24M4[5] | 97 | 96 | 95 | 96 | 95 |

[1] pH of carbon black determined in accordance with ASTM Method D 1512.
[2] The number of microequivalents of diphenylguanidine absorbed by one gram of carbon black; determined by back titration of benzene solution of diphenylguanidine with standard methanolic HCl using tetrabromophenylsulphonephthalein indicator.
[3] Nitrogen surface area in $m^2/g$ determined in accordance with ASTM Method D 3037.
[4] CTAB surface area in $m^2/g$ determined in accordance with Janzen, J. and Kraus, G., Rubber Chem. and Tech., 44, 1287 (1971).
[5] Structure in cc/100 grams is determined in accordance with U.S. Patent 3,548,454 as measured, after crushing, by Method B, ASTM 2414.

EXAMPLE II

The carbon black produced in accordance with the five runs of Example I was then tested in a rubber composition in accordance with the following recipe:

| RECIPE | |
|---|---|
| (Quantities are given in parts by weight) | |
| Carbon black | 70 |
| SBR 1712[1] | 96.25 |
| Cis-4 1203[2] | 30 |
| Philrich 5[3] | 13.75 |
| Zinc oxide | 3 |
| Stearic acid | 2 |
| MBTS[4] | 1 |
| DPG[5] | 0.5 |
| Sulfur | 1.75 |

[1] Trademark; a styrene/butadiene rubber polymerized at 41° F and containing approximately 23.5 wt. % bound styrene and about 27.3 wt. % highly aromatic oil made with a mixed acid soap and acid coagulant.
[2] Trademark; a butadiene polymer polymerized in solution and contains rosin acids and a non-staining stabilizer.
[3] Trademark; a highly aromatic oil.
[4] 2,2'-Benzothiazyl disulfide.
[5] Diphenylguanidine.

The five rubber mixtures were blended together thoroughly in a midget Banbury mixer for 13 minutes. The mixer was operated at a temperature of 125° F with a mill gage of 0.050 inch. The five samples were thereafter tested for their Mooney viscosity and their scorch properties. The results obtained are shown in the following table.

TABLE II

| Run No. | 1 | 2 | 3 | 4 | 5 |
|---|---|---|---|---|---|
| Compound ML-4 at 212° F[1] | 55½ | 56½ | 56½ | 57 | 56½ |
| Scorch at 266° F, min. Mooney[2] | 45.2 | 42.3 | 43.6 | 43.8 | 43.2 |
| 5 pt. rise, min.[2] | 12.5 | 15.9 | 16.3 | 16.7 | 19.5 |

[1] ASTM D 1646-74, compound Mooney viscosity using large rotor at 4 min. test time and 212° F test temperature.
[2] ASTM D 1646-74.

The data show a considerable increase for the scorch time with as low a concentration of $HNO_3$ as 0.1%. The data of this table are also shown in FIG. 2 of the enclosed drawing in a diagrammatic form.

In order to further test the rubber composition containing the different carbon blacks, samples of the compounded rubber composition were formed into test samples and cured at 293° F for three different curing times, namely 30, 40 and 60 minutes. The cured samples were tested for various mechanical properties and the results thereof are shown in the following table.

TABLE III

| Run No. | Min. Cured | 1 | 2 | 3 | 4 | 5 |
|---|---|---|---|---|---|---|
| Compression Set, %[1] | 30 | 20.3 | 24.3 | 25.5 | 26.4 | 31.9 |
| | 40 | 14.6 | 16.9 | 17.4 | 18.6 | 21.1 |
| | 60 | 9.5 | 10.5 | 11.1 | 10.8 | 13.0 |
| 200% Modulus, psi[2] | 30 | 610 | 560 | 505 | 530 | 500 |
| | 40 | 600 | 550 | 540 | 590 | 540 |
| | 60 | 650 | 650 | 580 | 610 | 620 |
| 300% Modulus, psi[2] | 30 | 1250 | 1120 | 1030 | 1060 | 1010 |
| | 40 | 1265 | 1110 | 1160 | 1160 | 1100 |
| | 60 | 1350 | 1265 | 1200 | 1250 | 1225 |
| Tensile, psi[2] | 30 | 2960 | 2840 | 2875 | 2760 | 2940 |
| | 40 | 2880 | 2675 | 3000 | 2890 | 3030 |
| | 60 | 2875 | 2825 | 2780 | 2810 | 2955 |
| Elongation, %[2] | 30 | 550 | 570 | 600 | 570 | 640 |
| | 40 | 520 | 530 | 590 | 560 | 610 |
| | 60 | 510 | 520 | 520 | 530 | 560 |
| $\Delta T, F$[3] | 40 | 65.2 | 69.1 | 69.7 | 68.0 | 69.6 |
| | 60 | 65.0 | 69.4 | 68.5 | 71.6 | 67.4 |
| Perm. Set, %[4] | 40 | 1.6 | 2.3 | 2.1 | 2.0 | 2.4 |
| | 60 | 1.1 | 1.6 | 1.2 | 1.4 | 1.5 |
| Resilience, %[5] | 40 | 60.5 | 56.5 | 57.4 | 58.7 | 59.5 |
| | 60 | 60.2 | 56.5 | 60.4 | 57.3 | 59.1 |
| Shore A Hardness on Comp. Sets[6] | 30 | 59 | 59 | 56 | 57 | 56 |
| | 40 | 59 | 58½ | 58½ | 58½ | 56½ |
| | 60 | 59 | 58½ | 58½ | 59 | 58 |

[1]ASTM D 395-67, except 2 hr. heat treatment at 212° F (under compression-spacer thickness 0.325 inches and 1 hr. after treatment (not compressed) at 212° F.
[2]ASTM D 412-68.
[3]ASTM D 623-67, Method A.
[4]ASTM D 623-67, Method A
[5]ASTM D 945-59.
[6]ASTM D 676-59.

The data shown in the table above clearly indicate that a very low concentration of $HNO_3$ in water is sufficient to result in a significant decrease in the 300% modulus. The results of these mechanical tests as far as the 300% modulus goes are also shown in a diagrammatic form in FIG. 1. These results indicate that the low concentration of $HNO_3$ is sufficient to achieve the desired reduction of the 300% modulus. In accordance with this invention, there is also provided an oxidation process which results in oxidized carbon black contributing controlled features to a rubber composition incorporating such a carbon black, while at the same time only a very minimal amount of the environmentally objectionable nitric acid is being used.

Reasonable variations and modifications which will become apparent to those skilled in the art can be made in this invention without departing from the spirit and scope thereof.

I claim:

1. A process to produce oxidized carbon black which comprises contacting said carbon black with an aqueous nitric acid having a concentration of about 0.05 to about 1 weight % with the weight ratio of $HNO_3$ to carbon black being in the range of about $5 \times 10^{-4}$ to about $1 \times 10^{-2}$ and drying the thus treated carbon black at a temperature in the range of about 400° to about 550° F.

2. A process in accordance with claim 1 wherein said carbon black is contacted with said aqueous nitric acid in a pelleting mill.

3. A process for treating carbon black so as to adjust and control the modulus and/or scorch time of a rubber composition containing said carbon black which comprises a. compounding a sample of said carbon black and a rubber into a rubber composition,
b. determining the modulus and/or scorch time of said rubber composition,
c. comparing said determined modulus and/or said determined scorch time with a preselected upper limit for the modulus and/or a preselected lower limit for the scorch time,
d. if said determined modulus is above said upper limit for the modulus, and/or if said determined scorch time is below said lower limit for the scorch time oxidizing the carbon black by
   aa. contacting said carbon black with an aqueous nitric acid having a concentration of about 0.05 to about 1 weight % at a weight ratio of $HNO_3$ to carbon black in the range of about $5 \times 10^{-4}$ to $1 \times 10^{-2}$, and
   bb. drying the thus treated carbon black at temperatures in the range of about 400° F to about 550° F.

4. A process in accordance with claim 3 wherein said oxidizing steps are carried out by mixing dry carbon black with said aqueous nitric acid in a weight ratio of dry carbon black to aqueous nitric acid in the range of about 2:1 to about 1:2 and thereafter drying the resulting mixture.

5. A process in accordance with claim 4 wherein said carbon black and said aqueous nitric acid are mixed in a pelleting mill.

* * * * *